United States Patent
Ishikawa et al.

(10) Patent No.: US 8,708,377 B2
(45) Date of Patent: Apr. 29, 2014

(54) LOCKING DEVICE

(75) Inventors: Masashi Ishikawa, Kariya (JP); Atsutaka Mitsuhashi, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 298 days.

(21) Appl. No.: 12/983,404

(22) Filed: Jan. 3, 2011

(65) Prior Publication Data
US 2011/0169279 A1 Jul. 14, 2011

(30) Foreign Application Priority Data

Jan. 12, 2010 (JP) ................................. 2010-003714

(51) Int. Cl.
E05C 19/10 (2006.01)
E05C 3/06 (2006.01)

(52) U.S. Cl.
USPC ............... 292/96; 292/95; 292/216; 297/336; 296/65.03

(58) Field of Classification Search
USPC ............. 292/95, 96, 216; 297/336; 296/65.03
See application file for complete search history.

(56) References Cited

U.S. PATENT DOCUMENTS

| 5,730,480 | A | * | 3/1998 | Takamura | 248/503.1 |
| 6,012,747 | A | * | 1/2000 | Takamura et al. | 292/216 |
| 6,945,585 | B1 | * | 9/2005 | Liu et al. | 296/65.03 |
| 7,044,552 | B2 | * | 5/2006 | Muller et al. | 297/336 |
| 7,243,974 | B2 | * | 7/2007 | Kondo et al. | 296/65.03 |
| 7,431,371 | B2 | * | 10/2008 | Miller et al. | 296/65.03 |
| 7,575,280 | B2 | * | 8/2009 | Palomba et al. | 297/336 |
| 7,762,605 | B2 | | 7/2010 | Otsuka et al. | |
| 7,926,858 | B2 | * | 4/2011 | Otsuka | 292/216 |
| 2005/0104384 | A1 | * | 5/2005 | Kondo et al. | 292/240 |
| 2010/0026013 | A1 | | 2/2010 | Otsuka et al. | |
| 2010/0032967 | A1 | | 2/2010 | Otsuka | |
| 2010/0133412 | A1 | | 6/2010 | Imajo | |

FOREIGN PATENT DOCUMENTS

| DE | 10304574 | 8/2004 |
| DE | 102004056086 | 1/2006 |
| DE | 102005023861 | 2/2006 |
| DE | 102007016409 | 10/2008 |
| JP | 52-77128 | 6/1977 |

(Continued)

OTHER PUBLICATIONS

Japanese Office Action dated May 28, 2013 w/English language translation.

(Continued)

*Primary Examiner* — Carlos Lugo
(74) *Attorney, Agent, or Firm* — Greenblum & Bernstein P.L.C.

(57) ABSTRACT

A hook that constitutes a locking device is pushed and rotated in accordance with movement of a striker that moves into a recessed portion of a base plate, and the striker S is sandwiched between the hook and the recessed portion. As the hook rotates, a pole rotates under bias force to a position at which the pole is engaged with the hook, so as to restrict rotation of the hook for returning to the initial position. The hook, when placed in the initial position, is held in a condition in which a corner portion of the hook is pressed under bias force against a stopper face of the pole, such that the hook is inhibited from rotating. The stopper face is curved in the shape of an arc drawn about a first support shaft that supports the pole.

3 Claims, 5 Drawing Sheets

(56) References Cited

FOREIGN PATENT DOCUMENTS

| | | |
|---|---|---|
| JP | 4-76173 | 3/1992 |
| JP | 2005-349925 | 12/2005 |
| WO | 2008/132973 | 11/2008 |

OTHER PUBLICATIONS

Germany Office Action, dated Dec. 5, 2013 along with an English language translation thereof.

* cited by examiner

LOCKING DEVICE

INCORPORATION BY REFERENCE

The disclosure of Japanese Patent Application No. 2010-3417 filed on Jan. 12, 2010 including the specification, drawings and abstract is incorporated herein by reference in its entirety.

BACKGROUND OF THE INVENTION

1. Field of the Invention

The invention relates to a locking device. More specifically, the invention relates to a locking device that is provided in one of two members to be engaged with each other, and is adapted to receive a striker provided on the other member so as to lock the striker in place.

2. Description of the Related Art

For example, a technology as disclosed in Japanese Patent Application Publication No. 4-76173 (JP-A-4-76173) is known as being applicable to this type of locking device. The locking device as disclosed in this publication includes a base plate having a recessed portion that can receive a striker, and a hook and a pole supported by respective support shafts so as to be rotatable relative to the base plate. The hook and the pole are normally biased under bias force of respective springs in opposite rotational directions. The hook is held in a rotational position at which a part of the hook extends over the recessed portion of the base plate.

When the striker is pushed into the recessed portion of the base plate relative to the base plate, the hook is pushed and rotated according to the movement of the striker. As a result, a part of the hook is turned and located behind the striker so that the recessed portion is closed. In this closed position, the pole is engaged with the hook under bias force, so that the hook is held in a condition in which rotation of the hook is inhibited by the pole.

However, according to the related art as disclosed in the above-indicated publication, the hook is normally held in a condition in which the hook is engaged with the pole under bias force of the spring, such that the hook is pressed against a protrusion formed on the pole. In this condition, the hook is inhibited from rotating since the pole is pressed against an outer circumferential portion of the hook. Therefore, when the hook is pushed in and rotated by the striker, large frictional resistance is generated between the hook and the pole during sliding movements thereof, and the hook may not be smoothly rotated when the striker moves into the recessed portion of the hook.

SUMMARY OF THE INVENTION

The invention provides a locking device in which a stopper structure for holding a hook to be engaged with a striker in a pre-locking initial position is provided without increasing the number of components, and the stopper structure is designed so as not to hamper smooth rotation of the hook.

A first aspect of the invention is concerned with a locking device that is provided in one of two members to be engaged with each other, and is adapted to receive a striker provided on the other member so as to lock the striker in place. The locking device includes a base plate having a recessed portion that receives the striker, a first support shaft connected to the base plate, a pole (or pawl) that is rotatably supported by the first support shaft, a second support shaft connected to the base plate, and a hook that is rotatably supported by the second support shaft. When the striker moves into the recessed portion of the base plate, the hook is pushed and rotated by the striker in accordance with the movement of the striker, and the striker is sandwiched between the hook and the recessed portion. When the hook rotates to a position at which the striker is sandwiched between the hook and the recessed portion, the pole rotates under bias force to a position at which the pole is engaged with the hook, so as to establish a locked state in which rotation of the hook in a direction to return to an initial position thereof is restricted. When the hook is in the initial position before the striker moves into the recessed portion, the hook is pressed under bias force against a stopper face formed on the pole, such that no pressing force is applied from the hook in a direction to rotate the pole, and the hook is held in a condition in which the hook is inhibited from rotating.

According to the first aspect of the invention, when the striker enters deep into the recessed portion of the base plate, the hook is pushed and rotated, so that the striker is sandwiched between the hook and the recessed portion. In accordance with the rotation of the hook, the pole is rotated under bias force, and is engaged with the hook, so as to establish the locked state in which rotation of the hook in the direction to return to the initial position is restricted or inhibited. When the hook is in the initial position before the striker enters deep into the recessed portion of the base plate, the hook is pressed under bias force against the stopper face formed on the pole, and is held in the condition in which the hook is inhibited from rotating. Thus, the stopper structure for holding the hook in the pre-locking initial position is formed by an abutting arrangement of the hook and pole that abut on each other, and is thus provided without increasing the number of components of the locking device. Also, the abutting arrangement of the hook and pole is established such that the hook is pressed against the stopper face in such a manner that no pressing force is applied from the hook to the pole in a direction to rotate the pole. With the stopper structure thus constructed, the pole is kept from being pushed and rotated by the hook and pressed against the outer circumferential surface of the hook, and smooth rotation of the hook is not hampered when the striker enters the recessed portion of the base plate.

In the locking device according to the first aspect of the invention, an abutting arrangement of the hook and the stopper face of the pole which are in abutment with each other may be designed such that a normal to a plane including a contact of the hook with the stopper face passes the axis of the first support shaft.

In the locking device constructed as described above, the abutting arrangement of the hook and the stopper face of the pole is designed such that the normal to the plane including the contact of the hook with the stopper face passes the axis of the first support shaft that supports the pole. With this arrangement, no pressing force is applied to the pole in the direction of rotation thereof even if the pole is pressed by the hook, and such pressing force is supported by the first support shaft. Thus, the stopper structure is provided in which the hook abuts on the stopper face of the pole in such a manner as not to push and rotate the pole.

In the locking device as described above, the stopper face of the pole may be formed to be curved in the shape of an arc that is drawn about the axis of the first support shaft.

With the locking device thus constructed, the stopper face of the pole is formed to be curved in the shape of the arc drawn about the axis the first support shaft, so that the normal to the plane including the contact of the hook with the stopper face of the pole passes the axis or center of the first support shaft.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

One embodiment of the invention will be described with reference to the drawings.

Figure 1:
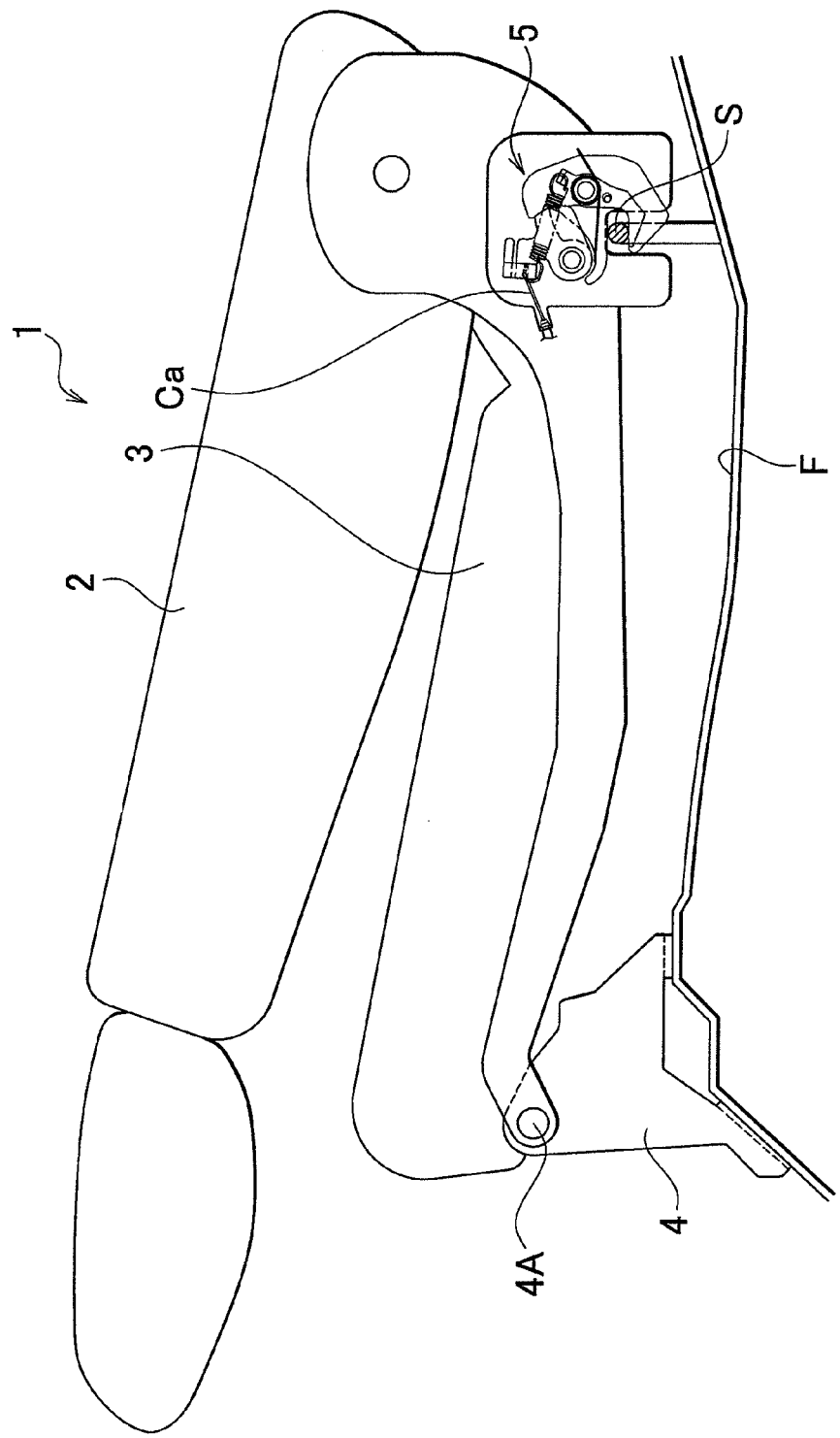
FIG. 1 is a side view of a vehicle seat in which a locking device according to one embodiment of the invention is used.

Initially, the construction of a locking device 5 of the embodiment will be described with reference to FIG. 1 through FIG. 6. As shown in FIG. 1, the locking device 5 of this embodiment is provided in a vehicle seat 1, and includes an operating structure that is engaged with a striker S mounted on a floor F so as to lock the striker S in place or release the striker S from the locked state. The vehicle seat 1 includes a seat back 2 that supports the back of a passenger, and a seat cushion 3 on which the passenger is seated, and both side portions at the front end of the seat cushion 3 are rotatably coupled, or hinged, to support bases 4 that are fixedly mounted on the floor F.

The locking devices 5 as described above are provided in both side portions at the rear end of the seat cushion 3. The locking devices 5 are normally engaged or locked with the strikers S, so that the seat cushion 3 is locked into and held in a laid position in which the seat cushion 3 lies on the floor F. By operating a release lever (not shown) provided on the vehicle seat 1, the locking devices 5 that are engaged or locked with the strikers S are released from the engaged/locked states.

By operating the above-mentioned release lever (not shown), the vehicle seat 1 may be switched to a folded position in which the seat back 2 is tilted forward and folded onto the upper surface of the seat cushion 3. Thus, through the operation of the above-mentioned release lever, the vehicle seat 1 is switched to the above-described folded position, and is further switched to a condition in which the seat 1 is allowed to be flipped up forward while rotating about connecting points 4A at which the seat cushion 3 is coupled to the support bases 4, when the locking devices 5 that are engaged or locked with the strikers S are released from the engaged/locked states.

With the above arrangement, the vehicle seat 1 is brought into and held in a storage position in which the seat 1 is flipped up forward, under bias force of bias springs (not shown) provided at its coupling portions with the support bases 4. The vehicle seat 1 that is in the storage position is adapted to be returned to and held in the laid position in which the seat lies on the floor F, when the vehicle seat 1 is turned over onto the floor F and each locking device 5 is pushed in to be engaged or locked with the corresponding striker S on the floor F.

More specifically, each of the locking devices 5 as described above is arranged to be pushed and moved by the corresponding striker S so as to be engaged or locked with the striker S, when the locking device 5 is pushed in against the striker S. The construction of each locking device 5 as described above will be described in detail with reference to FIG. 1 through FIG. 6. To make it easier to understand the construction of the locking device 5, a cover plate attached integrally to a base plate 10 (which will be described later) is not illustrated in each of the drawings.

Figure 2:
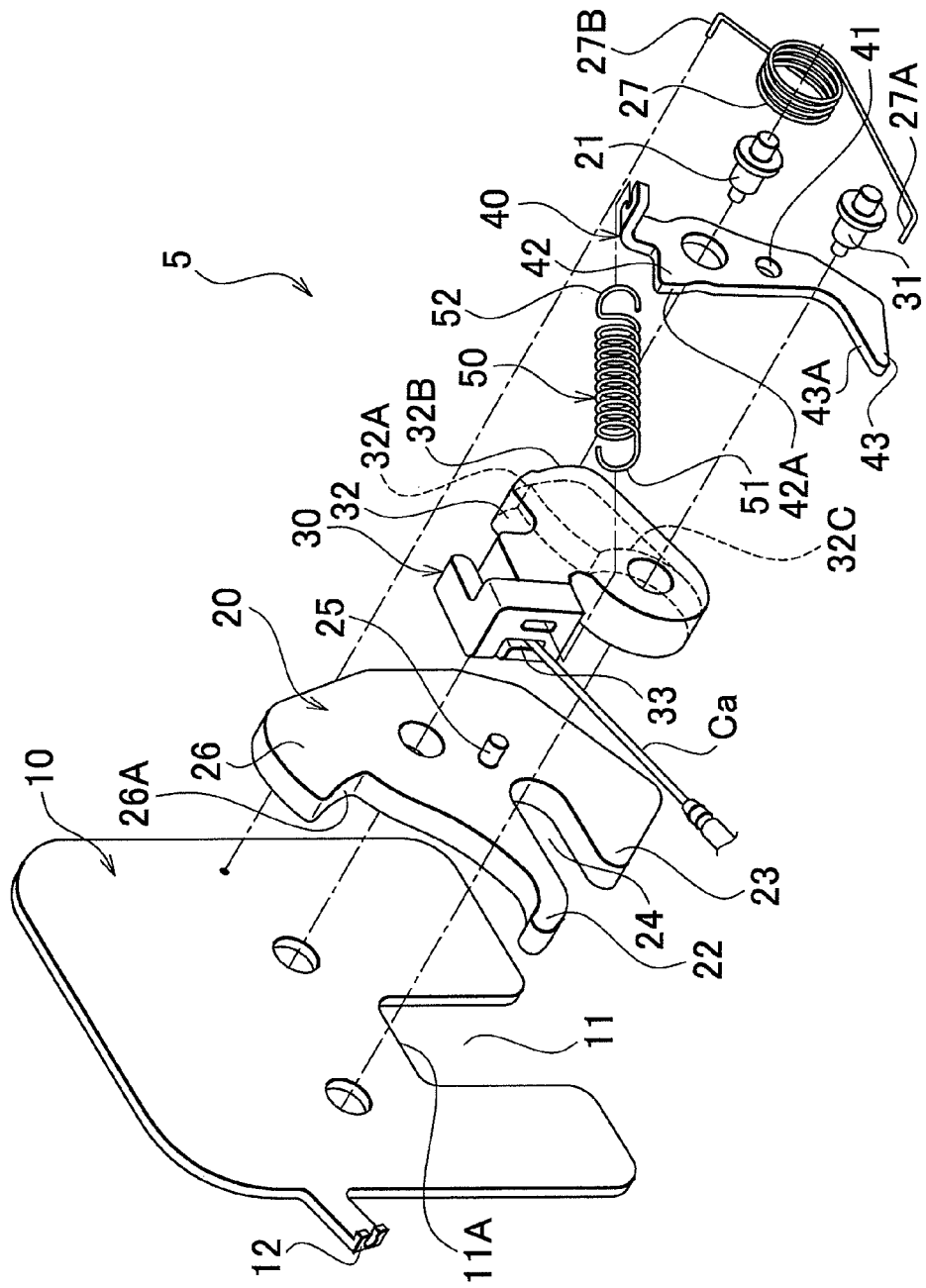
FIG. 2 is an exploded perspective view of the locking device.

As shown in FIG. 1 and FIG. 2, the locking device 5 has a base plate 10 that is fixed integrally to a skeletal frame of the seat cushion 3, hook 20 and driving plate 40 that are rotatably supported on a second support shaft 21 to be connected to the base plate 10, a pole 30 (or pawl) that is rotatably supported on a first support shaft 31 to be connected to the base plate 10, an extension spring 50 that is hung between the pole 30 and the driving plate 40 and biases the pole 30 and the driving plate 40 in opposite directions of rotation thereof, and a torsion spring 27 that biases the hook 20 in a direction of rotation, relative to the base plate 10.

Figure 3:
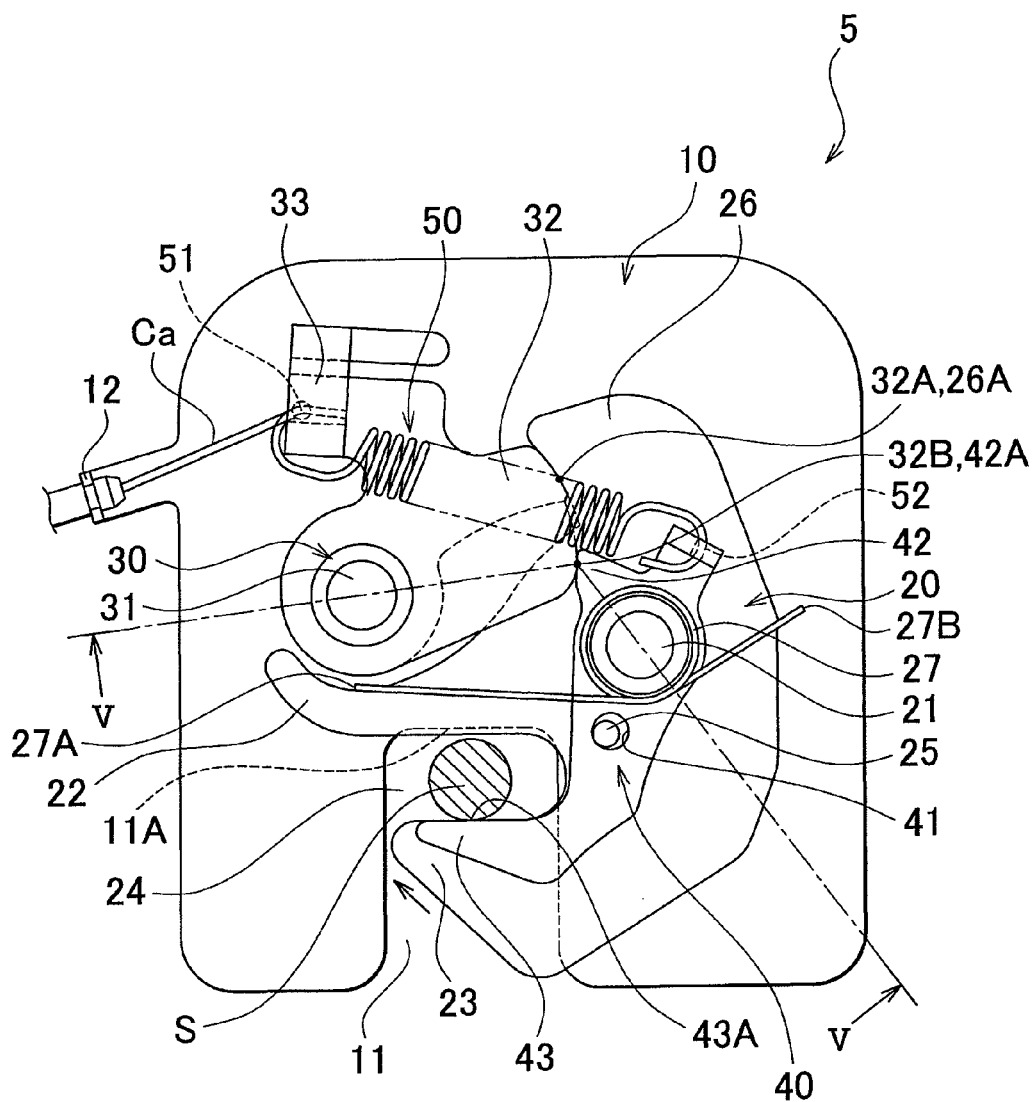
FIG. 3 is a view showing a locked state of the locking device.
Figure 6:
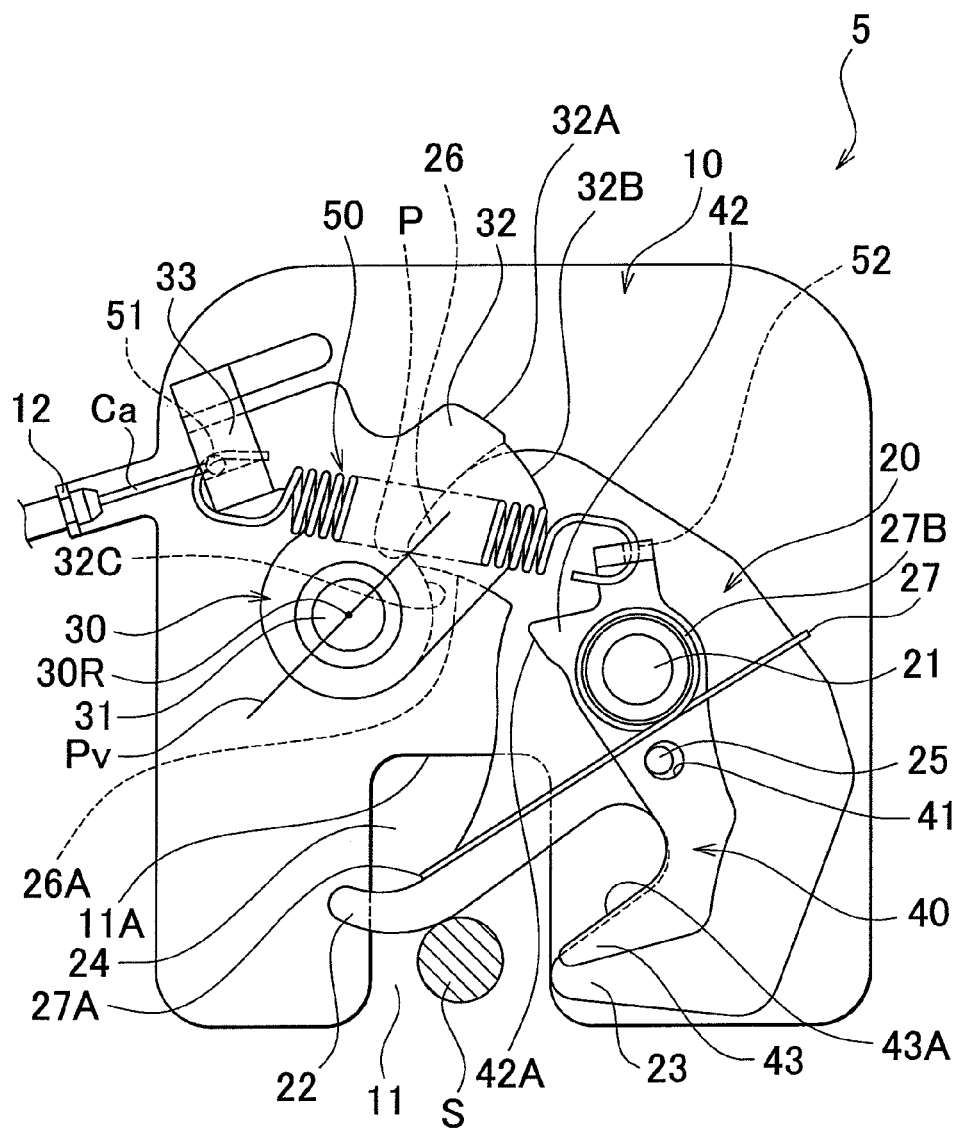
FIG. 6 is a view showing a released state of the locking device.

First, the general construction of each of the constituent components as indicated above will be briefly described. As shown in FIG. 6, the hook 20 is normally held in an initial rotational position in which its upper jaw portion 22 extends over a recessed portion 11 of the base plate 10, under the bias force of the torsion spring 27 that is hung between the hook 20 and the base plate 10. When the striker S makes its way into the recessed portion 11 of the base plate 10, the upper jaw portion 22 of the hook 20 is pressed by the striker S and rotates. As a result, a lower jaw portion 23 of the hook 20 is located at the back side of the striker S, as shown in FIG. 3, so that the striker S is received in a receiving opening 24 formed between the upper jaw portion 22 and the lower jaw portion 23. In this condition, the hook 20 is held in a condition in which rotation of the hook 20 is inhibited by the pole 30.

In the meantime, the pole 30 is normally held in a condition in which its corner portion 32 is pressed against an outer circumferential surface of a corner portion 26 of the hook 20, under the bias force of the extension spring 50. When the hook 20 rotates to a position where the striker S is sandwiched between the upper and lower jaw portions 22, 23, and the corner portion 26 of the hook 20 is disengaged from the corner portion 32 of the pole 30, as shown in FIG. 3, the pole 30 rotates under the bias force of the extension spring 50 so that the corner portion 26 of the hook 20 rides onto an outer circumferential surface (engaging face 32A) of the corner portion 32. As a result, rotary movement of the hook 20 in a direction to return to the initial position under the bias force is restricted, and the striker S is locked in a condition where it is engaged with the hook 20.

As shown in FIG. 2, a pin 25 formed as a protrusion on the hook 20 is inserted in an engagement hole 41 of the driving plate 40, such that the driving plate 40 and the hook 20 are arranged to rotate in association with each other. As shown in FIG. 6, the driving plate 40 is normally held in a condition in which an inner wall of the engagement hole 41 is pressed against the pin 25 of the hook 20, under the bias force applied by the extension spring 50 hung between the driving plate 40 and the pole 30 in the counterclockwise direction as viewed in FIG. 6.

As the hook 20 rotates while being pushed by the striker S, and the pole 30 rotates in a direction (the clockwise direction as viewed in the drawings) in which its corner portion 32 is brought into engagement with the corner portion 26 of the hook 20, as shown in FIG. 3, the driving plate 40 rotates with its corner portion 42 pressed by the corner portion 32 of the pole 30. As a result, a leg portion 43 of the driving plate 40 presses the striker S from the back side, so that the striker S is further driven inwardly of the recessed portion 11, and is held in a condition in which the striker S is pressed against the upper jaw portion 22 of the hook 20. Thus, the striker S is sandwiched under pressure between the upper jaw portion 22 of the hook 20 and the leg portion 43 of the driving plate 40, to be held in a condition where the striker S does not rattle between the above components.

In the following, the structure of each component of the locking device 5 as described above will be described in detail. Initially, the structure of the base plate 10 will be described. As shown in FIG. 2, the base plate 10 is coupled integrally to the skeletal frame of the seat cushion 3 (see FIG. 1), and various operating components, such as the hook 20, pole 30 and the driving plate 40, are mounted on the base plate 10. The recessed portion 11 that can receive the striker S is cut out and formed through the base plate 10. As shown in FIG. 6, the lateral width of the recessed portion 11 receiving the striker S is larger than the diameter of the striker S as measured in a section thereof, and the recessed portion 11 is formed in a rectangular shape with the lateral width having a constant dimension and extending inwards, so as to allow the striker S to reach a position at which the striker S abuts on an upper face 11A (or a bottom wall of the recessed portion 11) having a flat shape.

Referring back to FIG. 2, the structure of the hook 20 will be described. The hook 20 is rotatably connected to the base plate 10 by means of the second support shaft 21. The hook 20 is formed with the pin 25 that protrudes from the plane of the hook 20 in the axial direction. With the pin 25 inserted into the round engagement hole 41 formed through the driving plate 40, the hook 20 is arranged to rotate as a unit with the driving plate 40.

As shown in FIG. 6, the hook 20 is normally held in a biased state, under the bias force of the torsion spring 27 hung between the hook 20 and the base plate 10, which force is applied in the counterclockwise direction as viewed in FIG. 6. The torsion spring 27 has one end 27A that is hung on the upper jaw portion 22 of the hook 20, and the other end 27B attached integrally to the base plate 10. With this arrangement, the hook 20 is held in the initial rotational position in which the corner portion 26 formed at an outer circumferential portion of the hook 20 abuts on a stopper face 32C of the pole 30, before the striker S enters deep into the recessed portion 11 of the base plate 10.

When the hook 20 is in the above-indicated initial rotational position, the upper jaw portion 22 formed in the shape of an arm to extend from an outer circumferential portion of the hook 20 is held in a position in which the upper jaw portion 22 extends over the recessed portion 11 of the base plate 11 (i.e., in a condition in which the upper jaw portion 22 and the recessed portion 11 overlap each other). As the striker S enters deep into the recessed portion 11 of the base plate 10, the upper jaw portion 22 of the hook 20 is pressed by the striker S, and the hook 20 is pushed and rotated from the above-indicated position in the clockwise direction as viewed in the drawings, against the bias force of the torsion spring 27 (see FIG. 3).

With the hook 20 thus rotated, the lower jaw portion 23 formed as a projection at an outer circumferential portion of the hook 20 turns to be located behind the striker S, so that the striker S is received in the receiving opening 24 between the lower jaw portion 23 and the upper jaw portion 22. As the hook 20 is rotated as described above, the pole 30 and the hook 20 are disengaged from each other, and the corner portion 32 of the pole 30 is brought into abutment with the corner portion 26 of the hook 20 in the direction of rotation of the pole 30. Thus, the engaging face 32A of the corner portion 32 of the pole 30 comes into contact with an engaging face 26A the corner portion 26 of the hook 20. As a result, rotation of the hook 20 in a direction to return to the initial position under the bias force of the torsion spring 27 is restricted.

In the manner as described above, the striker S is sandwiched between the upper jaw portion 22 and lower jaw portion 23 of the hook 20, in the recessed portion 11 of the base plate 10, so that the striker S is held in an engaged state in which the striker S does not come out of the recessed portion 11. The engaged state of the striker S thus established by the hook 20 is released, when the pole 30 is rotated in the counterclockwise direction as viewed in the drawings, due to an operation to pull a cable Ca attached to the pole 30, and the corner portion 32 of the pole 30 is displaced or retracted from the position at which the corner portion 32 abuts on the corner portion 26 of the hook 20. More specifically, if the corner portion 32 of the pole 30 is displaced or retracted from the position at which it abuts on the corner portion 26 of the hook 20, due to a pulling operation on the cable Ca, the hook 20 rotates in the counterclockwise direction as viewed in the drawings, under the bias force of the torsion spring 27. As a result, the upper jaw portion 22 pushes the striker S toward the outside of the recessed portion 11, so that the striker S is disengaged and released from the hook 20 (see FIG. 6).

The above-mentioned cable Ca has a double structure in which a wire-like inner cable is inserted through the inside of an outer cable that serves as a guide tube. One end of the outer cable is hung on and fixed to a hook portion 12 formed on the base plate 10, and one end of the inner cable is hung on and fixed to a hook portion 33 of the pole 30. The inner cable is connected at the other end to a release lever (not shown). When the release lever is operated, the inner cable is pulled so that the pole 30 is rotated in the counterclockwise direction as viewed in the drawings.

Referring back to FIG. 2, the structure of the pole 30 will be described. The pole 30 is rotatably connected to the base plate 10 by means of the first support shaft 31. As shown in FIG. 6, the pole 30 is normally biased in the clockwise direction as viewed in the drawings, under the bias force of the extension spring 50 hung between the pole 30 and the driving plate 40. Thus, the pole 30 is held in the initial rotational position in which the corner portion 32 formed as a projection at an outer circumferential portion of the pole 30 abuts on an outer circumferential surface of the corner portion 26 of the hook 20, before the striker S enters deep into the recessed portion 11 of the base plate 10.

Figure 5:
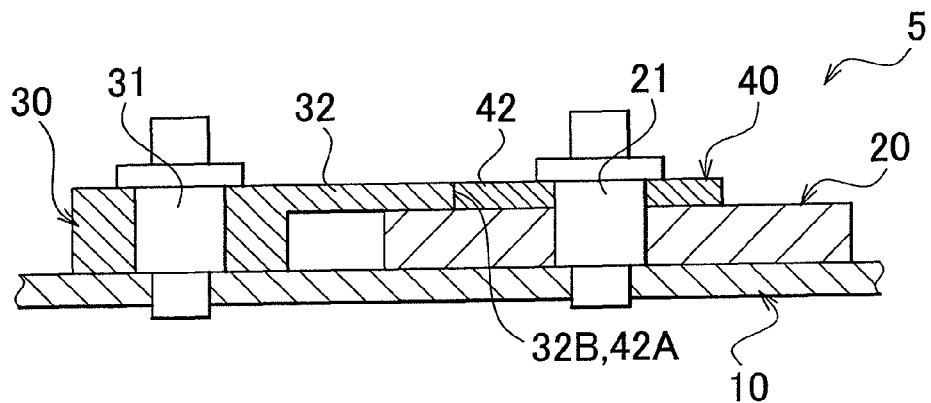
FIG. 5 is a cross-section view taken along 5V-5V in FIG. 3.

As shown in FIG. 2 and FIG. 5, the pole 30 is formed with a thickness that is equal to or larger than the sum of the thickness of the hook 20 as measured in the axial direction and the thickness of the driving plate 40 as measured in the axial direction. The pole 30 is opposed to the hook 20 and the driving plate 40 in the radial directions thereof. The outer circumferential surface of the corner portion 32 of the pole 30 is divided in the axial direction into the engaging face 32A against which the engaging face 26A of the corner portion 26 of the hook 20 is pressed as the pole 30 rotates under the bias force of the extension spring 50, and a driving face 32B that is brought into abutment with a pressed face 42A of the corner portion 42 of the driving plate 40.

The corner portion 32 of the pole 30 includes an arm portion whose outer circumferential surface is the engaging face 32A. A hollow portion adapted to receive the corner portion 26 of the hook 20 is formed under the arm portion of the corner portion 32. The lower surface of the arm that forms the hollow portion provides a stopper face 32C that abuts on the corner portion 26 of the hook 20 so that the pole 30 is engaged with the hook 20 (see FIG. 6). As shown in FIG. 6, the stopper face 32C is formed to be curved in the shape of an arc that is drawn about the axis of the first support shaft 31 that supports the pole 30, and the arc-shaped face intersects with a track or path along which the corner portion 26 of the hook 20 rotates.

With the above arrangement, a normal Pv to a plane including a contact P at which the corner portion 26 of the hook 20 abuts on the stopper face 32C of the pole 30 passes the axis of the first support shaft 31 that supports the pole 30 (i.e., the center of rotation 30R of the pole 30), and the pole 30 is not pushed and rotated by the hook 20 in the clockwise direction as viewed in the drawings, even though the corner portion 26 of the hook 20 is pressed against the stopper face 32 C of the pole 30 under the bias force. Thus, since the pole 30 is not pushed and rotated by the hook 30 in the clockwise direction, the corner portion 32 of the pole 30 is prevented from being pressed against the outer circumferential surface of the corner portion 26 of the hook 20. As a result, when the hook 20 is pushed and rotated by the striker S, the frictional resistance due to sliding of the hook 20 relative to the corner portion 32 of the pole 30 is kept small, and the hook 20 can be smoothly rotated.

When the striker S enters deep into the recessed portion 11 so as to push and rotate the hook 20, and the corner portion 26 of the hook 20 is displaced or retracted from the hollow portion of the corner portion 32 of the pole 30, the pole 30 rotates in the clockwise direction as viewed in the drawings, under the bias force of the extension spring 50, and the corner portion 32 falls into space under the corner portion 26 of the hook 20. Thus, as shown in FIG. 3, the corner portion 26 of the hook 20 is supported by the corner portion 32 of the pole, and the hook 20 is kept in a condition where rotation of the hook 20 in the direction to return to the initial position (FIG. 6) is restricted, though the bias force of the torsion spring 27 is applied to the hook 20 in the counterclockwise direction even after the striker S reaches the inner face 11A of the recessed portion 11.

The corner portion 32 of the pole 30 has the engaging face 32A that abuts on the corner portion 26 of the hook 20, and the engaging face 32A is formed to be curved in the shape of an arc is drawn about the axis of the first support shaft 31 as the center of rotation of the pole 30. Also, the engaging face 26A of the corner portion 26 of the hook 20 that is brought into contact with the engaging face 32A when the corner portion 32 of the pole 30 falls into the space under the corner portion 26 of the hook 20 is formed to be curved in the shape of an arc that is drawn about the axis of the first support shaft 31 as the center of rotation of the pole 30.

Namely, both the engaging face 32A of the corner portion 32 of the pole 30 and the engaging face 26A of the corner portion 26 of the hook 20 are curved in the shape of the arc drawn about the axis of the first support shaft 31. Therefore, even if the angle of the corner portion 32 of the pole 30 relative to the corner portion 26 of the hook 20 is changed, the engaging face 32A of the corner portion 32 of the pole 30 is kept in planar contact with the engaging face 26A of the corner portion 26 of the hook 20. Also, when the corner portion 32 of the pole 30 falls into the space under the corner portion 26 of the hook 20, no force acts on the hook 20 to push and rotate the corner portion 26 of the hook 20 in the clockwise direction, irrespective of the angle of rotation of the corner portion 32 of the pole 30 in the direction in which the corner portion 32 falls, because of the above-described relationship between the engaging faces 32A, 26A.

Accordingly, when the corner portion 26 of the hook 20 is displaced or retracted from the hollow portion of the corner portion 32 of the pole 30 due to rotation of the hook 20 (i.e., when the locking device 5 shifts from the condition of FIG. 6 to the condition of FIG. 3), the corner portion 32 of the pole 30 smoothly falls into the space under the corner portion 26 of the hook 20, and the engaging face 32A is kept in planar contact with the engaging face 26A of the corner portion 26 of the hook 20. When the pole 30 rotates so that its corner portion 32 falls into the space under the corner portion 26 of the hook 20, as shown in FIG. 3, the corner portion 42 of the driving plate 40 is pressed against the driving face 32B of the pole 30. With the driving face 32B being in contact with the corner portion 42 of the driving plate 40, the pole 30 operates to rotate the driving plate 40 in the clockwise direction as the rotation of the pole 30 proceeds, and the driving plate 40 causes the striker S to be pressed against the upper jaw portion 22 of the hook 20.

Referring back to FIG. 2, the structure of the driving plate 40 will be described. The driving plate 40 is rotatably connected, along with the above-described hook 20, to the base plate 10 by means of the second support shaft 21. More specifically, the pin 25 formed as a projection on the hook 20 is inserted in the round engagement hole 41 formed through the thickness of the driving plate 40. The engagement hole 41 is formed in a circular shape having a larger diameter than the diameter of the pin 25.

With the above arrangement, the hook 20 and the driving plate 40 do not move along with each other as long as the pin 25 is movable within the engagement hole 41. If, however, the pin 25 comes into contact with the inner wall of the engagement hole 41, the hook 20 and the driving plate 40 move along with each other and rotate as a unit. The extension spring 50 is hung between the driving plate 40 and the pole 30. As shown in FIG. 6, the driving plate 40 is normally biased in the counterclockwise direction under the bias force of the extension spring 50, and the inner wall of the engagement hole 41 abuts on the pin 25 of the hook 20 that is inhibited from rotating, so that the driving plate 40 is inhibited from rotating relative to the hook 20.

Figure 4:
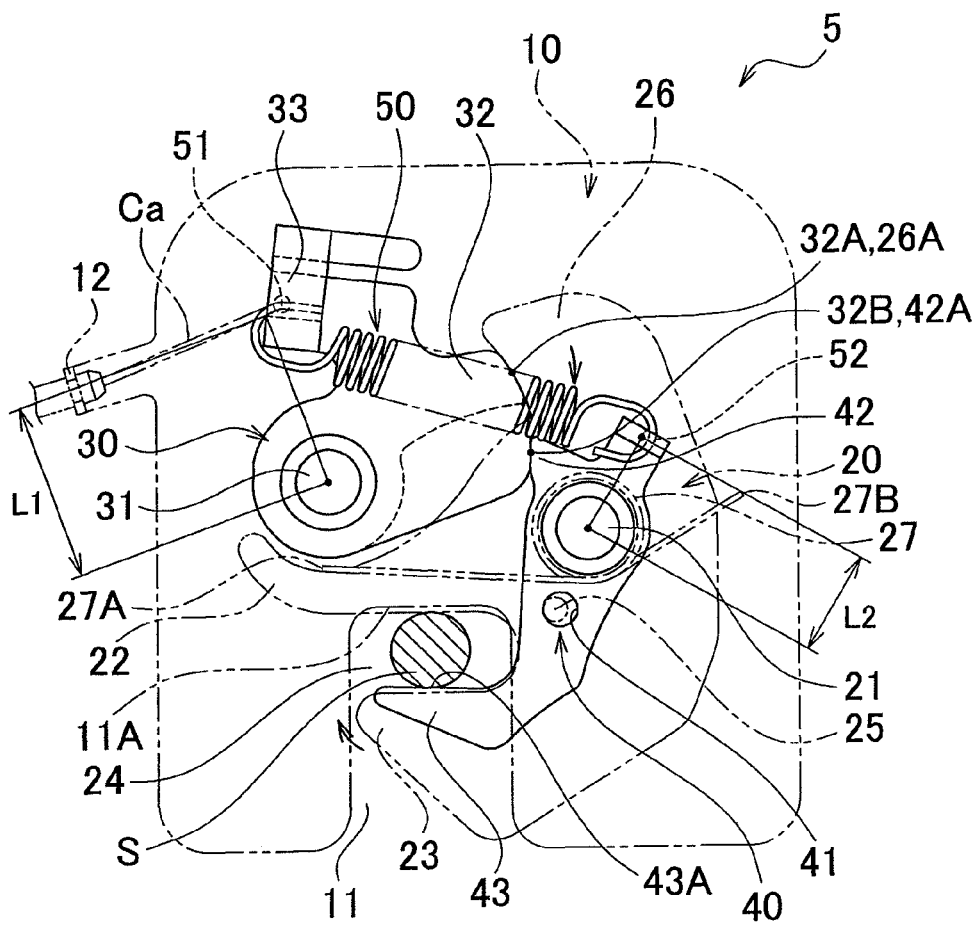
FIG. 4 is a view showing the manner of driving a strike in the locking device.

When the hook 20 is pressed and rotated by the striker S, and the pole 30 rotates while being in contact with the hook 20, as shown in FIG. 3, the driving plate 40 is pressed at its outer surface (pressed face 42A) of the corner portion 42 by the driving face 32B of the corner portion 32 of the pole 30, and is pushed and rotated in the clockwise direction as viewed in the drawings. As a result, the driving plate 40 pushes the striker S at the driving face 43A of the leg portion 43, further into the deep side of the recessed portion 11, so that the striker S is held in a condition in which it is pressed against the upper jaw portion 22 of the hook 20, as shown in FIG. 4. If the hook 20 is pushed and rotated by the striker S, and the upper jaw portion 22 reaches a position that is higher than the upper face 11A of the recessed portion 11 of the base plate 10, the driving plate 40 presses the striker S, at its driving face 43A, against the upper face 11A of the recessed portion 11.

The shape of the pressed face 42A of the above-described driving plate 40 (or the angle of the pressed face 42A relative to the driving face 32B of the corner portion 32 of the pole 30) is set so that the driving plate 40 is displaced little by little in the clockwise direction as the pole 30 rotates in the clockwise direction as viewed in the drawings. More specifically, the pressed face 42A is not formed to be curved in the shape of the same arc as that of the driving face 32B of the pole 30. Rather, the pressed face 42A is shaped so that the driving plate 40 receives rotary force applied from the driving face 32B of the pole 30 in the clockwise direction, in accordance with the rotation of the pole 30 in the clockwise direction.

As shown in FIG. 4, the extension spring 50 hung between the pole 30 and the driving plate 40 is positioned such that the distance L1 between one end 51 of the spring 50 attached to the pole 30 and the center or axis of the first support shaft 31 is larger than the distance L2 between the other end 52 attached to the driving plate 40 and the center or axis of the second support shaft 21. With this arrangement, torque that causes the pole 30 to rotate in the clockwise direction is larger than torque with which the driving plate 40 is rotated in the counterclockwise direction under the bias force of the extension spring 50; therefore, the pole 30 is able to push and rotate the driving plate 40 in the driving direction.

With the above arrangement, the striker S is engaged with the locking device 5, and the driving plate 40 drives the striker S into a condition in which the striker S is retained without rattling. As described above, the engagement of the striker S with the locking device 5 is released or cancelled by operating a release lever (not shown) to pull the cable Ca connected to the pole 30. Namely, when the cable Ca is pulled, the pole 30 is rotated in the counterclockwise direction as shown in FIG. 6, and the corner portion 32 of the pole 30 is disengaged from the corner portion 26 of the hook 20 and the corner portion 42 of the driving plate 40. As a result, the hook 20 and the driving plate 40 are rotated in the counterclockwise direction under the bias forces of the torsion spring 27 and the extension spring 50, respectively, so that the striker S is pushed out by the upper jaw portion 22 of the hook 20, and is released from the condition where the striker S is engaged with the hook 20.

Thus, according to the locking device 5 of this embodiment, when the striker S enters deep into the recessed portion 11 of the base plate 10, the hook 20 is pushed and rotated by the striker S, and the striker S is sandwiched or gripped between the hook 20 and the recessed portion 11. As the hook 20 rotates, the pole 30 rotates under the bias force, and is brought into engagement with the hook 20. As a result, the hook 20 is placed in a locked state in which rotation of the hook 20 in the direction to return to the initial position is restricted or inhibited. Before the striker S enters deep into the recessed portion 11 of the base plate 10, the hook 20 is held in the initial position or condition in which the hook 20 is pressed against the stopper face 2C formed on the pole 30 under the bias force and is thus inhibited from rotating.

Thus, the stopper structure for holding the hook 20 in the pre-locking initial position is formed by an abutting arrangement of the hook 20 and the pole 30 that abut on each other, and is thus provided without increasing the number of components of the locking device 5. Also, the abutting arrangement of the hook 20 and the pole 30 is established by pressing the hook 20 against the stopper face 32C of the pole 30 without applying pressing force to the pole 30 in the direction to rotate the pole 30. Therefore, the pole 30 is less likely to be or prevented from being pushed and rotated by the hook 20 and pressed against the outer circumferential surface of the hook 20, and smooth rotation of the hook 20 is not hampered.

More specifically, the abutting arrangement of the hook 20 and the stopper face 32C of the pole 30 is designed such that the stopper face 32C of the pole 30 is formed to be curved in the shape of an arc that is drawn about the axis of the first support shaft 31 that supports the pole 30, so that the normal Pv to the plane including the contact P of the hook 20 and the stopper face 32C of the pole 30 passes the axis of the first support shaft 31 that supports the pole 30 (or the center 30R of rotation of the pole 30). With this arrangement, the pole 30 is not subjected to pressing force applied in the direction of rotation even if the pole 30 is pressed by the hook 20, and the force applied from the hook 20 to the pole 30 is supported by the first support shaft 31.

While one embodiment of the invention has been described above, the invention may be embodied in various forms other than the illustrated embodiment. For example, the locking device of this invention may be used as those other than the device for locking the vehicle seat 1 on the floor F by engagement as shown in the illustrated embodiment. Namely, the use of the locking device is not particularly limited, provided that the locking device is provided in one of two members to be engaged with each other, and is adapted to receive a striker provided on the other member so as to lock the striker in place.

In the illustrated embodiment, the stopper face 32C of the pole 30 is formed to be curved in the shape of an arc drawn about the axis of the first support shaft 31. As another embodiment, the stopper face 32C of the pole 30 may be formed as a flat face that faces in a radial direction of the first support shaft 31 such that the stopper face 32C is in planar contact with the corner portion 26 of the hook 20. Also, in the illustrated embodiment, the stopper face 32C is formed to be curved outwards in the shape of an arc drawn about the axis of the first support shaft 31. As another embodiment, the stopper face 32C may be curved inwards or concaved to form a recess, and the corner portion of the hook 20 may be formed to be curved in a convex shape so that the corner portion is in planar contact with the recess formed by the stopper face 32C.

In the illustrated embodiment, the hook 20 is biased against the base plate 10 by means of the torsion spring 27. As another embodiment, the hook may be biased against the base plate 10 by means of a spring that is hung between the pole and the driving plate. Namely, the hook is biased by the spring hung between the pole and the driving plate, utilizing the arrangement in which the hook and the driving plate move along with each other. In this case, however, the spring hung between the pole and the driving plate needs to have strong spring force.

In the illustrated embodiment, the extension spring 50 is hung between the pole 30 and the driving plate 40. However, the spring mounted between the pole 30 and the driving plate 40 is not limited to the extension spring, but various types of springs, such as compression springs or helical springs attached to the pole and the driving plate, respectively, may be used. Also, an extension spring may be hung between the hook and the driving plate, rather than between the hook and the base plate, so as to apply bias force to the hook. Where the driving plate is not provided, biasing means, such as an extension spring, may be mounted between the hook and the pole.

What is claimed is:

1. A locking device that is provided in one of two members to be engaged with each other, and is adapted to receive a striker provided on the other member so as to lock the striker in place, comprising:
   a base plate having a recessed portion that receives the striker;
   a first support shaft connected to the base plate;
   a pawl that is rotatably supported by the first support shaft and biased in a first initial rotation position;
   a second support shaft connected to the base plate;
   a hook that is rotatably supported by the second support shaft and biased in a second initial rotation position that is opposite to the first initial rotation position of the pawl;
   a driving plate rotatably supported by the second support shaft such that the driving plate is engaged and rotatable with the hook to lock the striker;
   an extension spring operably connecting the pawl and the driving plate such that the pawl and the driving plate are biased in opposite directions of rotation; and
   a torsion spring that biases the hook in the second initial rotation position, wherein
   when the striker moves into the recessed portion of the base plate, the hook is pushed from the second initial rotation position and rotated by the striker in accordance with the movement of the striker, and the striker is sandwiched between the hook and the recessed portion, when the pawl is in the first initial rotation position, a corner portion of the pawl engages under the bias force a corner portion of the hook, when the hook rotates from the second initial rotation position to a position at which the striker is sandwiched between the hook and the recessed portion, the corner portion of the hook disengages from the corner portion of the pawl and the pawl rotates under a bias force from the first initial rotation position to a position at which the pawl is engaged with the hook so as to establish a locked state in which rotation of the hook in a direction to return to the second initial rotation position thereof is restricted, the pawl and the hook being engaged in the locked state with engaging faces that are curved in an arc-shape about an axis of the first support shaft, respectively, and when the hook is in the second initial rotation position before the striker moves into the recessed portion, the hook is pressed under a bias force against a stopper face provided on the pawl such that no pressing force is applied from the hook in a direction to rotate the pawl, and the hook is held in a condition in which the hook is inhibited from rotating.

2. The locking device according to claim 1, wherein an abutting arrangement of the hook and the stopper face of the pawl which are in abutment with each other is designed such that a normal to a plane including a contact of the hook with the stopper face passes an axis of the first support shaft.

3. The locking device according to claim 2, wherein the stopper face of the pawl is curved in an arc-shape about the axis of the first support shaft.

* * * * *